(12) United States Patent
Song et al.

(10) Patent No.: US 8,803,328 B1
(45) Date of Patent: Aug. 12, 2014

(54) RANDOM CODED INTEGRATED CIRCUIT STRUCTURES AND METHODS OF MAKING RANDOM CODED INTEGRATED CIRCUIT STRUCTURES

(71) Applicant: International Business Machines Corporation, Armonk, NY (US)

(72) Inventors: Yunsheng Song, Poughkeepsie, NY (US); Keith Kwong Hon Wong, Wappingers Falls, NY (US); Yongchun Xin, Poughkeepsie, NY (US); Zhijian Yang, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/746,427

(22) Filed: Jan. 22, 2013

(51) Int. Cl.
*H01L 23/48* (2006.01)

(52) U.S. Cl.
USPC .......................................................... 257/774

(58) Field of Classification Search
CPC .............. H01L 23/481; H01L 23/5226; H01L 21/02601; H01L 51/426
USPC .......................................................... 257/774
See application file for complete search history.

(56) References Cited

U.S. PATENT DOCUMENTS

| | | | |
|---|---|---|---|
| 7,335,153 B2 | 2/2008 | Seul et al. | |
| 7,488,671 B2 * | 2/2009 | Corderman et al. | 438/479 |
| 7,692,952 B2 | 4/2010 | DeHon | |
| 2006/0071334 A1 * | 4/2006 | Kawabata et al. | 257/741 |
| 2010/0315153 A1 | 12/2010 | Oksanen et al. | |
| 2011/0215829 A1 | 9/2011 | Merchan et al. | |
| 2012/0020145 A1 | 1/2012 | Huber et al. | |
| 2012/0168506 A1 | 7/2012 | Ruehrmair et al. | |
| 2012/0301734 A1 * | 11/2012 | Walker et al. | 428/469 |

FOREIGN PATENT DOCUMENTS

WO    WO2012077856    6/2012

OTHER PUBLICATIONS

U.S. Appl. No. 13/570,968, "Electronic Structure Containing a VIA Array as a Physical Unclonable Function", filed Aug. 9, 2012.

* cited by examiner

*Primary Examiner* — A. Sefer
(74) *Attorney, Agent, or Firm* — Schmeiser, Olsen & Watts; William Steinberg (57) ABSTRACT

Randomized coded arrays and method of forming a randomized coded array. The methods include: forming a dielectric layer on a semiconductor substrate; forming an array of openings extending through the dielectric layer; introducing particles into a random set of less than all of the openings; and forming a conductive material in each opening of the array of openings, thereby creating the randomized coded array, wherein a first resistance of a pathway through the conductive material in openings containing the particles is different from a second resistance of a path through openings not containing the particles. Also, a physically unclonable function embodied in a circuit.

20 Claims, 9 Drawing Sheets

RANDOM CODED INTEGRATED CIRCUIT STRUCTURES AND METHODS OF MAKING RANDOM CODED INTEGRATED CIRCUIT STRUCTURES

TECHNICAL FIELD

The present invention relates to the field of physically unclonable functions; more specifically, it relates to random coded integrated circuit structures and methods of making random coded integrated circuit structures.

BACKGROUND

Physically unclonable functions (PUFs) are functions that are embodied in a physical structure that is relatively easy to evaluate but is relatively hard to characterize and practically impossible to duplicate. However, such structures are currently resource intensive to incorporate into integrated circuits. Accordingly, there exists a need in the art to mitigate the deficiencies and limitations described hereinabove.

BRIEF SUMMARY

A first aspect of the present invention is a method of forming a randomized coded array, comprising: forming a dielectric layer on a semiconductor substrate; forming an array of openings extending through the dielectric layer; introducing particles into a random set of less than all of the openings; and forming a conductive material in each opening of the array of openings, thereby creating the randomized coded array, wherein a first resistance of a pathway through the conductive material in openings containing the particles is different from a second resistance of a path through openings not containing the particles.

A second aspect of the present invention is a randomized coded array, comprising: a dielectric layer on a semiconductor substrate; an array of openings extending through the dielectric layer; particles in a random set of less than all of the openings; and a same conductive material in each opening of the array of openings, wherein a first resistance of a pathway through the conductive material in openings containing the particles is different from a second resistance of a path through openings not containing the particles.

A third aspect of the present invention is a physically unclonable function embodied in a circuit, comprising: a set of field effect transistors connected between a data line through respective resistors to ground and connected to respective row select lines; and wherein the respective resistors are embodied in a randomized coded array of contacts comprising: a dielectric layer on a semiconductor substrate; an array of openings extending through the dielectric layer; particles in a random set of less than all of the openings; and a same conductive material in each opening of the array of openings, wherein a first resistance of a pathway through the conductive material in openings containing the particles is different from a second resistance of a path through openings not containing the particles.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

DETAILED DESCRIPTION

An array is defined a matrix of n rows and c columns, where n and r are independently positive integers greater than zero and wherein both r and c are not equal to 1.

A contact is defined an integrated circuit structure comprising a trench in a dielectric layer filled with an electrically conductive material, where the contact physically and electrically connects elements of a device of the integrated circuit to an electrically conductive wire formed in an interlevel dielectric layer formed directly on the dielectric layer.

A via is defined as an integrated circuit structure comprising a trench in a dielectric layer filled with an electrically conductive material, where the via physically and electrically connects an electrically conductive lower wire formed in a lower interlevel dielectric layer to an electrically conductive upper wire formed in an upper dielectric layer. The lower wire and upper wire may be damascene structures. The dielectric layer and the higher dielectric layer may be the same layer and the via and upper wire may be an integral structure as, for example, in a dual-damascene structure.

A damascene process is one in which wire trenches or via openings are formed in a dielectric layer, an electrical conductor of sufficient thickness to fill the trenches is formed in the trenches and on a top surface of the dielectric. A chemical-mechanical-polish (CMP) process is performed to remove excess conductor and make the surface of the conductor coplanar with the surface of the dielectric layer to form damascene wires (or damascene vias). When only a trench and a wire (or a via opening and a via) is formed the process is called single-damascene.

A via first dual-damascene process is one in which via openings are formed through the entire thickness of a dielectric layer followed by formation of trenches part of the way through the dielectric layer in any given cross-sectional view. A trench first dual-damascene process is one in which trenches are formed part way through the thickness of a dielectric layer followed by formation of vias inside the trenches the rest of the way through the dielectric layer in any given cross-sectional view. All via openings are intersected by integral wire trenches above and by a wire trench below, but not all trenches need intersect a via opening. An electrical conductor of sufficient thickness to fill the trenches and via opening is formed on a top surface of the dielectric and a CMP process is performed to make the surface of the conductor in the trench co-planar with the surface of the dielectric layer to form dual-damascene wires and dual-damascene wires having integral dual-damascene vias.

Figure 1:
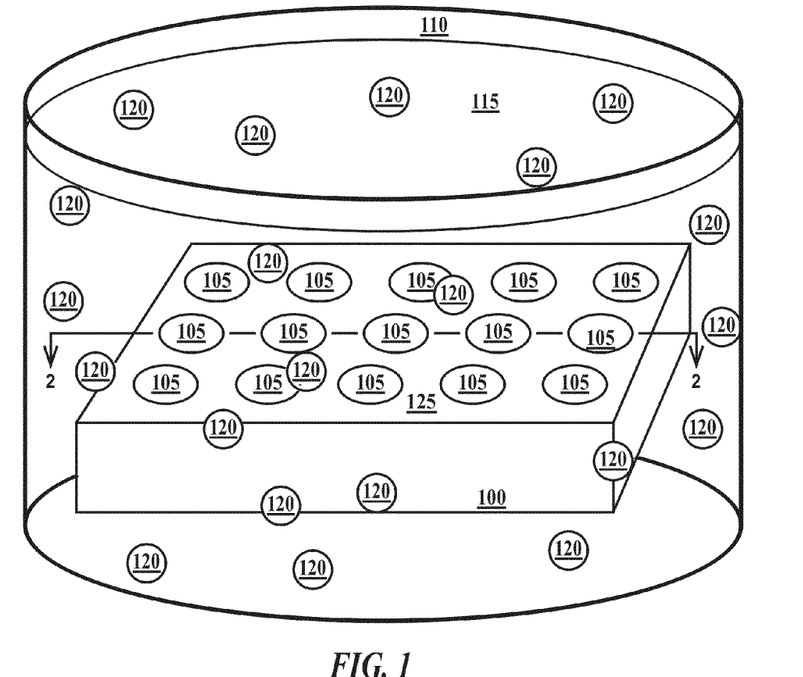
FIG. 1 illustrates a general method of introducing particles into random openings of a set or array of openings in a substrate according to embodiments of the present invention.

FIG. 1 illustrates a general method of introducing particles into random openings of a set or array of openings in a substrate according to embodiments of the present invention. In FIG. 1, a substrate 100 including an array of openings 105 is immersed in a tank 110 filled with a liquid 115 in which dielectric particles 120 are suspended. In one example, liquid 115 is water. In one example, particles 120 are silica particles having a diameter between about 10 nm and about 30 nm. In one example, the volume density of particles 120 in liquid 115 is selected to introduce particles into a preset number of openings of the array in a preset amount of time, wherein the preset number is less than all of the openings in the array. In one example, the volume density of particles 120 in liquid 115 is set to less than 50% of the area density of openings 105 in the surface of substrate 100. For example, if the combined area of openings 105 per unit area of surface 125 is 0.4 then less than 40% of the volume of the liquid/particle suspension is due to particles 120. After dipping substrate 120 in tank 110, the substrate is removed and excess liquid 115 and particles 120 are flushed from surface 125 and a drying process (e.g., baking above 25° C. in an oven in a non-oxidizing atmosphere) is performed to remove liquid 115 from openings 105 but leave particles 120 in some, but not all, of openings 105 as illustrated in FIG. 2.

Figure 2:
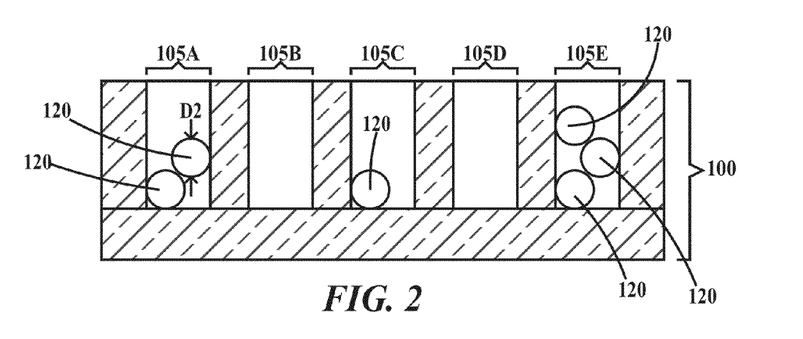
FIG. 2 is a cross-section through line 2-2 of FIG. 1.

FIG. 2 is a cross-section through line 2-2 of FIG. 1. In FIG. 2, there are two particles 120 at the bottom of opening 105A, no particles in the bottom of opening 105B, one particle 120 in the bottom of openings 105C, no particles in the bottom of opening 105D and three particles 120 at the bottom of opening 105E. The number of openings 105 containing particles is proportional to the volume density of particles 120 is liquid 115 of FIG. 1. Thus, an array of openings with a random subset of the opening containing particles may be formed.

Figure 3A:
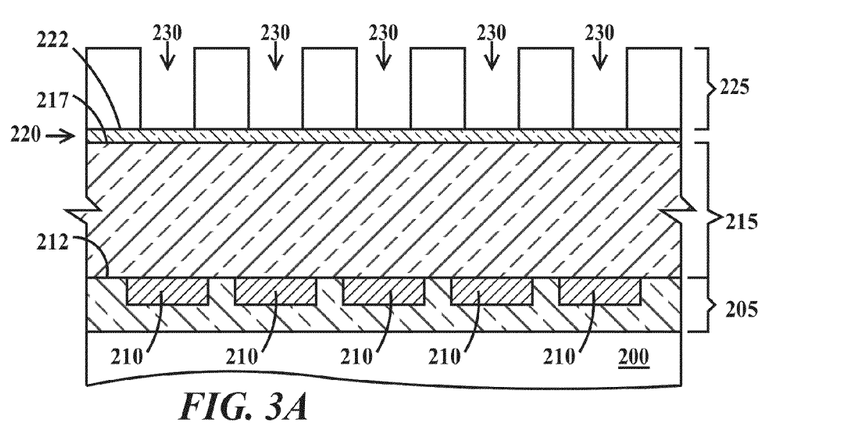
FIGS. 3A through 3G are cross-sections illustrating a method of forming an array of random coded contacts or vias according to first embodiments of the present invention.

FIGS. 3A through 3G are cross-sections illustrating a method of forming an array of random coded contacts or vias according to first embodiments of the present invention. In FIG. 3A, formed on semiconductor substrate 200 is a dielectric layer 205 and formed in dielectric layer are damascene wires 210. Formed on a top surface 212 of dielectric layer 215 is a dielectric layer 215. Formed on a top surface 217 of dielectric layer 215 is a dielectric layer 220. Formed on a top surface 222 of dielectric layer 220 is a patterned photoresist layer 225 containing openings 230. In one example, dielectric layer 220 is a diffusion barrier to copper.

Figure 3B:
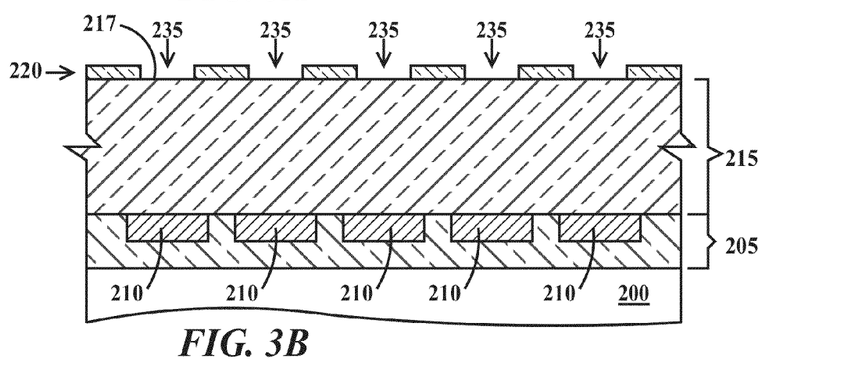

In FIG. 3B, a first reactive ion etch (RIE) selective to dielectric layer 235 is performed to form a patterned hardmask layer 220 having openings 235 and the photoresist layer 225 of FIG. 3A removed. Top surface 217 of dielectric layer 215 is exposed in openings 235.

Figure 3C:
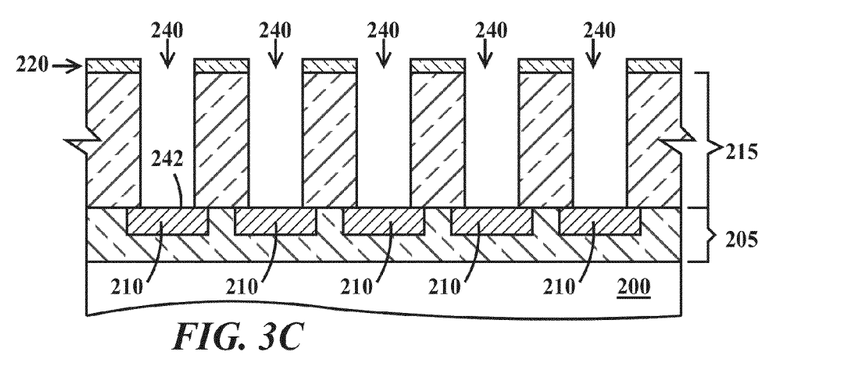

In FIG. 3C, a second RIE selective to dielectric layer 215 is performed to form via openings 240 in dielectric layer 215. Top surfaces 242 of wires 210 are exposed in via openings 240.

Figure 3D:
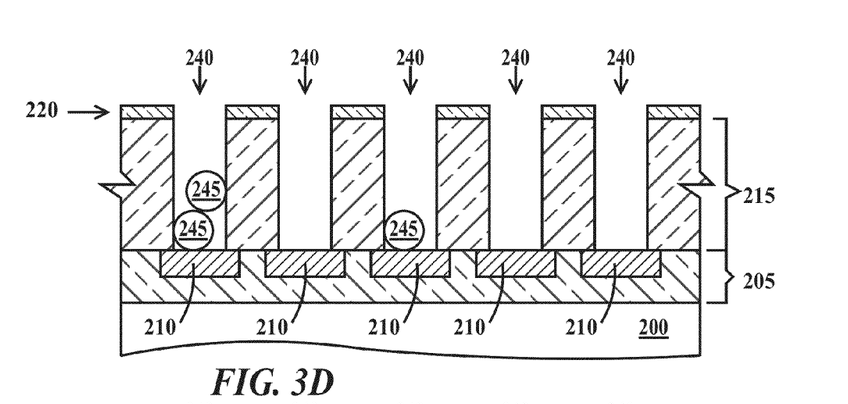

In FIG. 3D, particles 245 are introduced in to some, but not all, of via openings 240 according to the method described supra with respect to FIGS. 1 and 2. In FIG. 3D, two of the five via openings 240 contain particles 245. Particles 245 are the same as particles 120 of FIGS. 1 and 2.

Figure 3E:
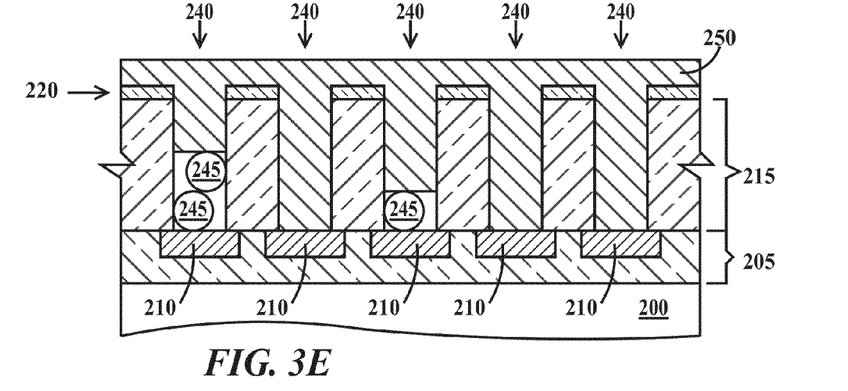

In FIG. 3E, an electrically conductive layer 250 is formed on dielectric layer 220 and in openings 240. Layer 250 completely fills via openings 240 that contain no particles 245 and physically and electrically contact wires 210, but in via openings containing particles 245, layer 250 does not contact wires 210.

Figure 3F:
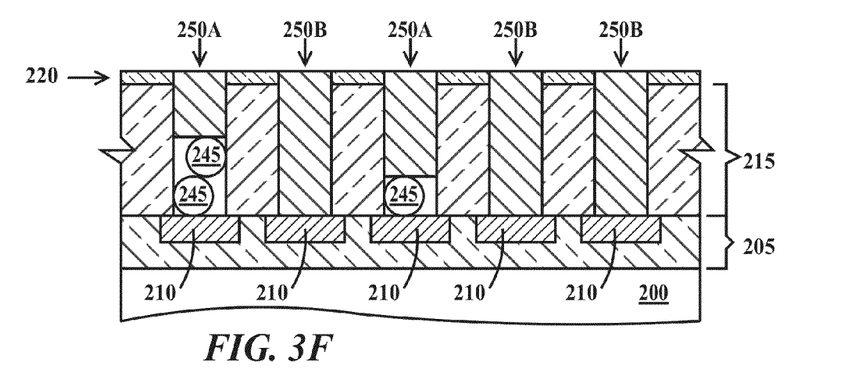
Figure 3G:
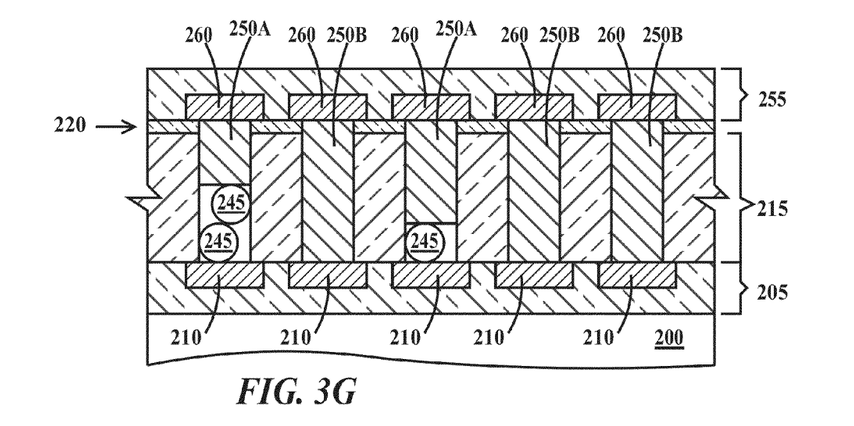

In FIG. 3F, a CMP is performed to remove excess layer 250 (see FIG. 3E) to form vias 250A containing particles 245 and vias 250B not containing particles 245. In FIG. 3G, a dielectric layer 255 including damascene wires 260 is formed on dielectric layer 220 with wires 260 in direct physical and electrical contact with vias 250A and 250B. While vias 250A are illustrated as not contacting wires 210, it is possible that vias 250A contact some but not all of the surfaces 242 regions of wires 245. Thus while vias 250B provide low resistance interconnections between wires 210 and 260, vias 250A provide no interconnection or a high resistance interconnect between wires 210 and 260.

While FIGS. 3A through 3G are illustrated using a single electrically conductive layer 250, alternatively, multiple layers may be utilized as illustrated in FIGS. 7A through 7D and described infra. While FIGS. 3A through 3G are illustrated using single damascene vias, alternatively the vias may be via portions of dual damascene wires (see FIG. 8). Additionally contacts to devices (e.g., field effect transistors) may be substituted for the single damascene vias of FIGS. 3A through 3G (see FIG. 5).

Figure 4A:
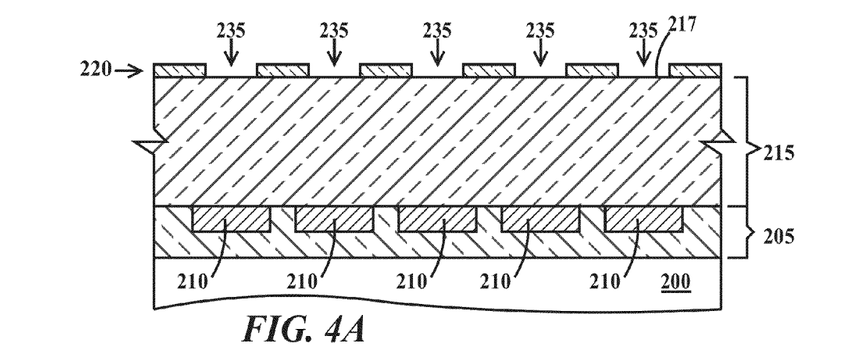
FIGS. 4A through 4G are cross-sections illustrating a variation of the method of FIGS. 3A through 3G for forming an array of random coded contacts or vias.
Figure 4B:
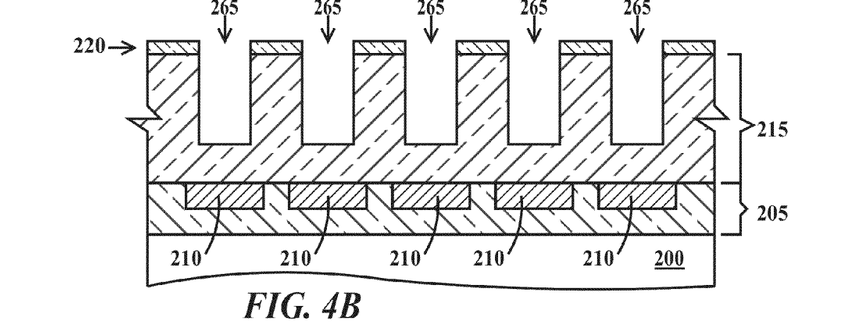

FIGS. 4A through 4G are cross-sections illustrating a variation of the method of FIGS. 3A through 3G for forming random coded contacts or vias. FIG. 4A is similar to FIG. 3B and is the starting point in this embodiment. In FIG. 4B, the second RIE selective to dielectric layer 215 is performed to form via openings 265 in dielectric layer 215. However, the RIE is performed only to a depth, for example, of between about 60% to about 80% of the thickness of dielectric layer 215. Wires 210 are not exposed in openings 265.

Figure 4C:
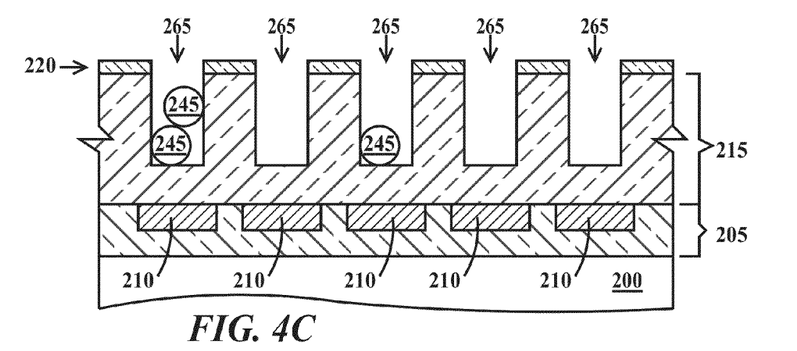

In FIG. 4C, particles 245 are introduced into some, but not all, of via openings 265 according to the method described supra with respect to FIGS. 1 and 2. In FIG. 4C, two of the five via openings 265 contain particles 245. Particles 245 are the same as particles 120 of FIGS. 1 and 2.

Figure 4D:
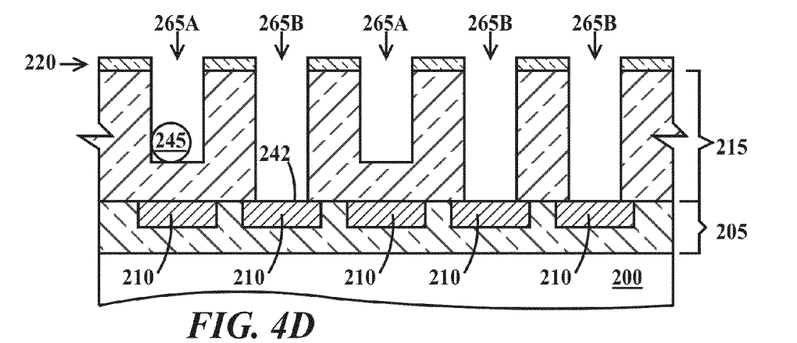

In FIG. 4D a third RIE selective to dielectric layer 215 is performed and optionally (as shown) to particles 245 to form via openings 265A and 265B. Particles 245 prevent complete etching of via openings 265A down to wires 210, while top surfaces 242 of wires 210 are exposed in via openings 265B.

Figure 4E:
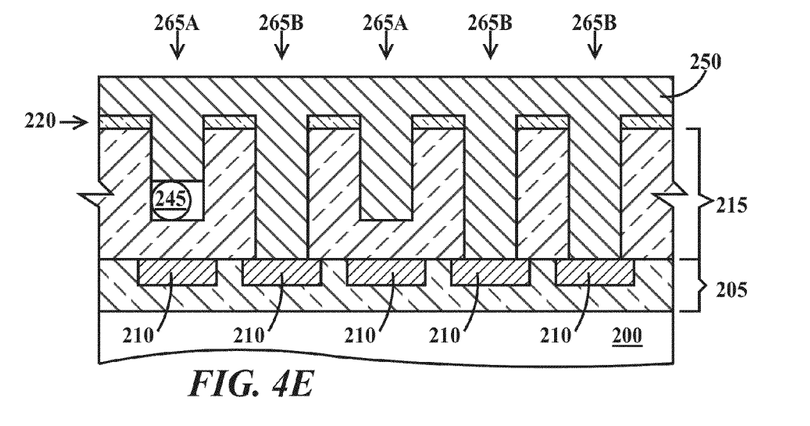

In FIG. 4E, electrically conductive layer 250 is formed on dielectric layer 220 and in openings 265A and 265B. Layer 250 completely fills via openings 265B and physically and electrically contacts wires 210, but in via openings 265A layer 250 does not contact wires 210 because regions of dielectric layer 215 intervene.

Figure 4F:
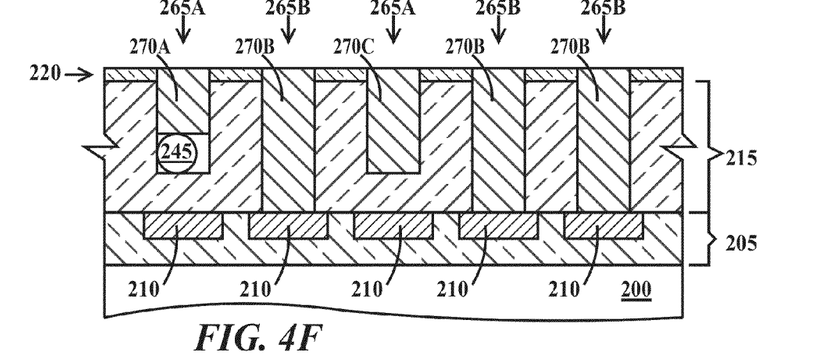
Figure 4G:
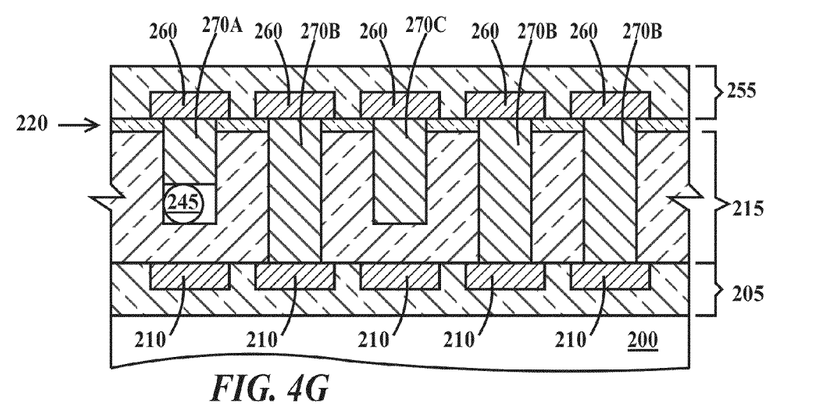

In FIG. 4F, a CMP is performed to remove excess layer 250 (see FIG. 4E) to form vias 227A, 270B and 270C. In FIG. 4G, dielectric layer 255 including damascene wires 260 is formed on dielectric layer 220 with wires 260 in direct physical and electrical contact with vias 270A, 270B and 270C. Vias 270A and 270C do not contact wires 210 while vias 270B contact wires 210. Thus while vias 270B provide low resistance interconnections between wires 210 and 260, vias 270A and 270B provide no interconnection between wires 210 and 260.

While FIGS. 4A through 4G are illustrated using a single electrically conductive layer 250, alternatively, multiple layers may be utilized as illustrated in FIGS. 7A through 7D and described infra. While FIGS. 4A through 4G are illustrated using single damascene vias, alternatively, the vias may be via portions of dual damascene wires (see FIG. 8). Additionally, contacts to devices (e.g., field effect transistors) may be substituted for the single damascene vias of FIGS. 4A through 4G (see FIG. 5).

Figure 5:
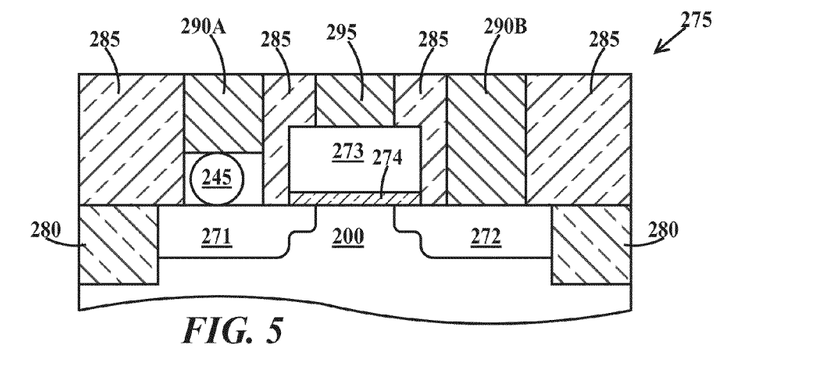
FIG. 5 is a cross-section of a field effect transistor illustrating contacts that may be randomized according to embodiments of the present invention.

FIG. 5 is a cross-section of a field effect transistor illustrating contacts that may be randomized according to embodiments of the present invention. In FIG. 5, a field effect transistor (FET) 275 includes a first source/drain 271 and a second source drain 272 formed in semiconductor substrate 200 and a gate electrode 273 separated from a region of the semiconductor substrate between the source/drains by a gate dielectric layer 274. Semiconductor portions of FET 275 are bordered by trench isolation 280 formed in substrate 200. A dielectric passivation layer 285 is formed over FET 275 and electrically conductive contacts 290A, 290B and 295 are formed in passivation layer 285. Contact 290A does not electrically contact source/drain 271 (or only partially contacts source/drain 271) so there is no interconnection to source/drain 271 or a high resistance interconnection to source/drain 271. Contact 290B contacts source/drain 272 so there is a low resistance interconnection to source/drain 272. Contact 295 contacts gate electrode 273 to there is a low resistance interconnection to gate electrode 273.

Figure 6A:
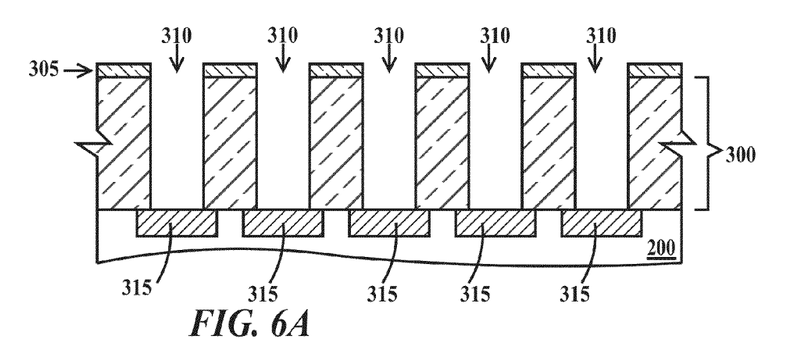
FIGS. 6A through 6F are cross-sections illustrating a method of forming an array of random coded contacts according to second embodiments of the present invention.

FIGS. 6A through 6F are cross-sections illustrating a method of forming an array of random coded contacts according to second embodiments of the present invention. FIG. 6A is similar to FIG. 3C, has been formed by similar processes, and is the starting point in this embodiment. In FIG. 6A, a dielectric passivation layer 300 is formed on semiconductor substrate 200, a patterned dielectric hardmask layer 304 (which may be a diffusion barrier to copper) is formed on passivation layer 300 and contact openings 310 are formed in passivation layer 300 down to device structures 315. In one example, device structures 315 are source/drains or gate electrodes of FETs.

Figure 6B:
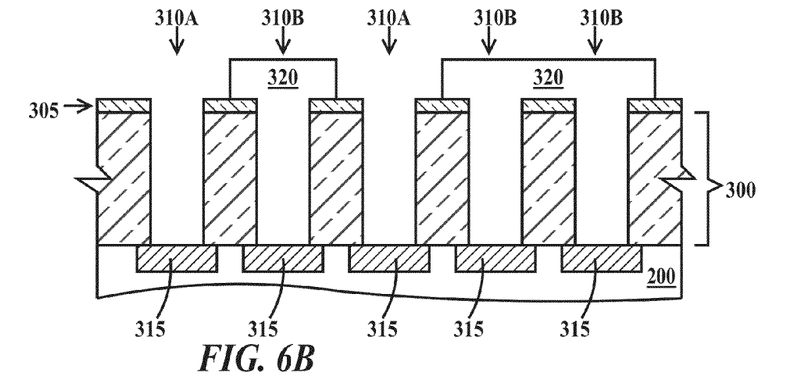

In FIG. 6B, a patterned photoresist layer 320 is formed that fills contact openings 310B, but does not fill contact openings 310A. This method requires multiple photomasks having different random contact patterns or an apparatus that can sequentially expose random regions of photoresist layer 320 to generate, after development (a positive photoresist is assumed), a random openings in photoresist layer 320 aligned over contact openings 310A.

Figure 6C:
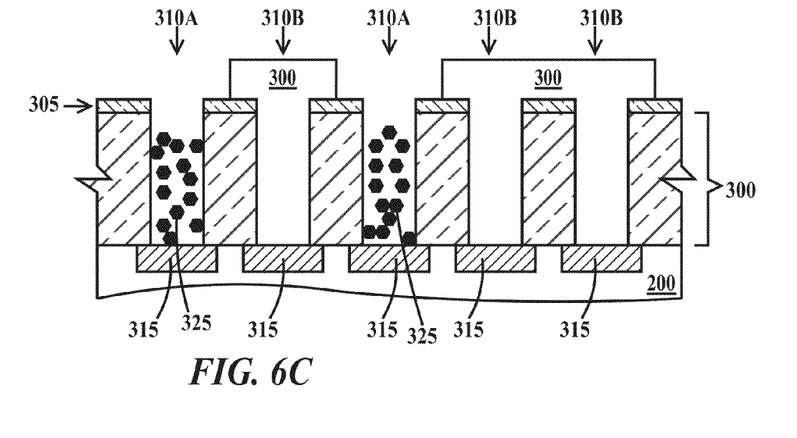

In FIG. 6C, in one example, nano-particles 325 are placed in via openings 310A. In one example, nano-particles are applied by spray or spin apply of a nano-particle slurry followed by a drying process (e.g., baking above 25° C. in an oven in a non-oxidizing atmosphere). In one example, nano-particles 325 have maximum dimension of between about 1 nm and about 10 nm. In one example, nano-particles 325 comprise a conductive material that has a lower resistivity than the core conductor of the contact to be formed subsequently. When the core conductor of the contact is tungsten (W), examples of lower resistivity materials are silver (Ag) or copper (Cu). In one example, nano-particles 325 comprise a conductive material that has a higher resistivity than the core conductor of the contact to be formed subsequently. When the core conductor of the contact is tungsten (W), examples of higher resistivity materials are cobalt silicide ($CoSi_2$) and titanium-tungsten (TiW).

Figure 6D:
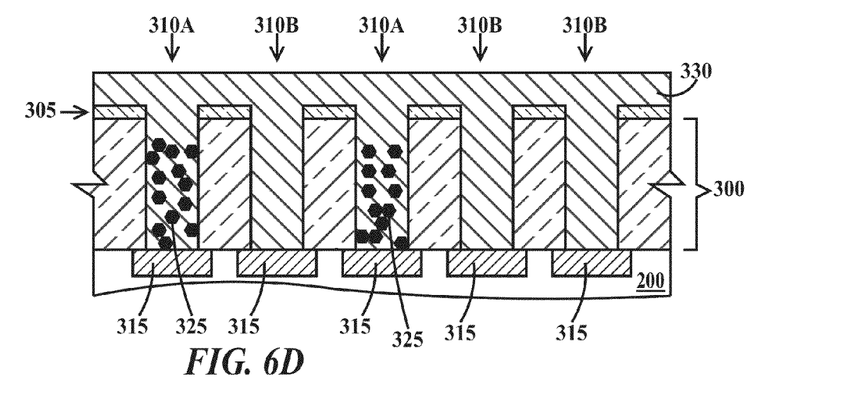

In FIG. 6D, electrically conductive layer 330 is formed on dielectric layer 305 and in openings 310A and 310B. Layer 305 fills contact openings 310B and physically and electrically contacts device structures 315, but in contact openings 310 layer 330 intermingles with nano-particles so the combination of layer 330 and nano-particles 325 fills contact openings 310A.

Figure 6E:
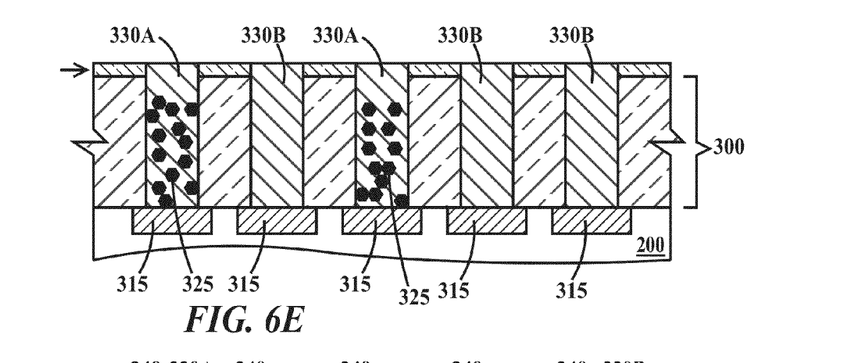
Figure 6F:
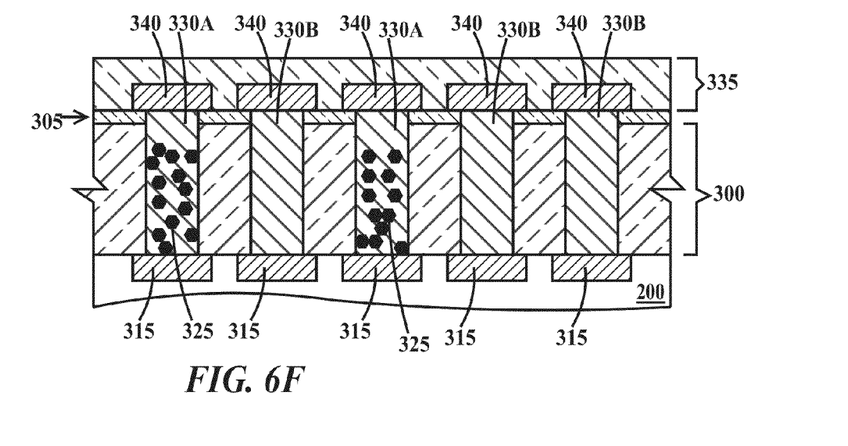

In FIG. 6E, a CMP is performed to remove excess layer 330 (see FIG. 6D) to form vias contacts 330A and 330B. In FIG. 6F, a dielectric layer 335 including damascene wires 340 is formed on dielectric layer 335 with wires 340 in direct physical and electrical contact with contacts 330A and 330B. The resistance of contacts 330A and 330B are different from the resistance of contacts 330B because of nano-particles 325. The nominal or design resistance of contacts 330B is the same. The resistance of contacts 330A may be the same or may be different. While FIGS. 6A through 6F are illustrated using only a core conductor 330, alternatively, contact openings may be filled with a liner and a core conductor as illustrated in FIGS. 7A through 7D and described infra.

Figure 7A:
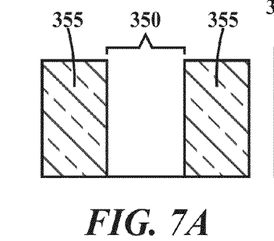
FIGS. 7A through 7D are cross-sections illustrating fabrication of a lined contact or via.
Figure 7B:
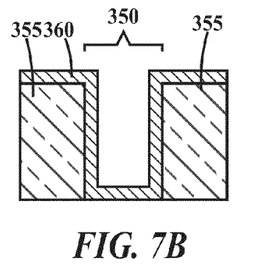
Figures 7C, 7D:
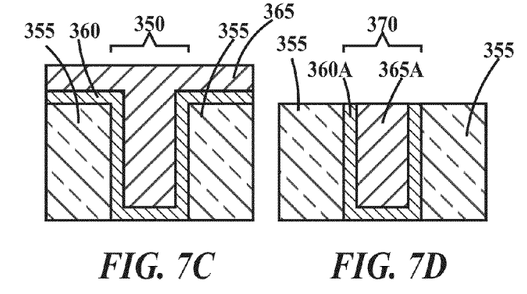

FIGS. 7A through 7D are cross-sections illustrating fabrication of a lined contact or via. In FIG. 7A, a contact or via opening 350 is etched in dielectric layer 355. In FIG. 7B, an electrically conductive and conformal liner layer 360 is formed, for example, by deposition or evaporation on top of dielectric layer 355 and on the sidewalls and bottom of opening 350. In FIG. 7C, a core conductor layer 365 is formed, for example, by deposition, or evaporation or plating on liner layer 360. Core conductor layer 365 fills remaining space in opening 350. In FIG. 7D, a CMP is performed to remove excess layers 360 and 365 to form a contact or via 370 comprising liner 360A and core conductor 365A. In one example, for a contact, the liner comprises titanium (Ti) and the core conductor comprises tungsten (W). In one example, for a via, the liner comprises a layer of tantalum nitride (TaN) and a layer of tantalum (Ta) and the core conductor comprise copper (Cu).

Figure 8:
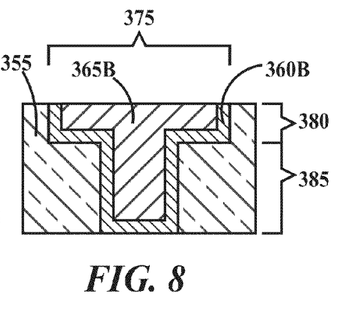
FIG. 8 is a cross-section through a dual-damascene wire where the via portion or the entire wire may be randomized according to the embodiments of the present invention.

FIG. 8 is a cross-section through a dual-damascene wire where the via portion or the entire wire may be randomized according to the embodiments of the present invention. In FIG. 8, a dual damascene wire 375 has been formed as described supra. Dual damascene wire 375 includes a wire portion 380 and a via portion 385, each including regions of liner 360B and core conductor 365B. Using the embodiments of FIGS. 3A through 3G or 4A through 4G, the via portion 385 may be randomized as to including or not including particles 245; the wire portion 380 not including particles 245. Using the embodiment of FIGS. 6A through 6F, either just via portion 385 (and not the wire portion 380) or both via portion 385 and wire portion 380 may be randomized as to including or not including nano-particles 325.

Figure 9:
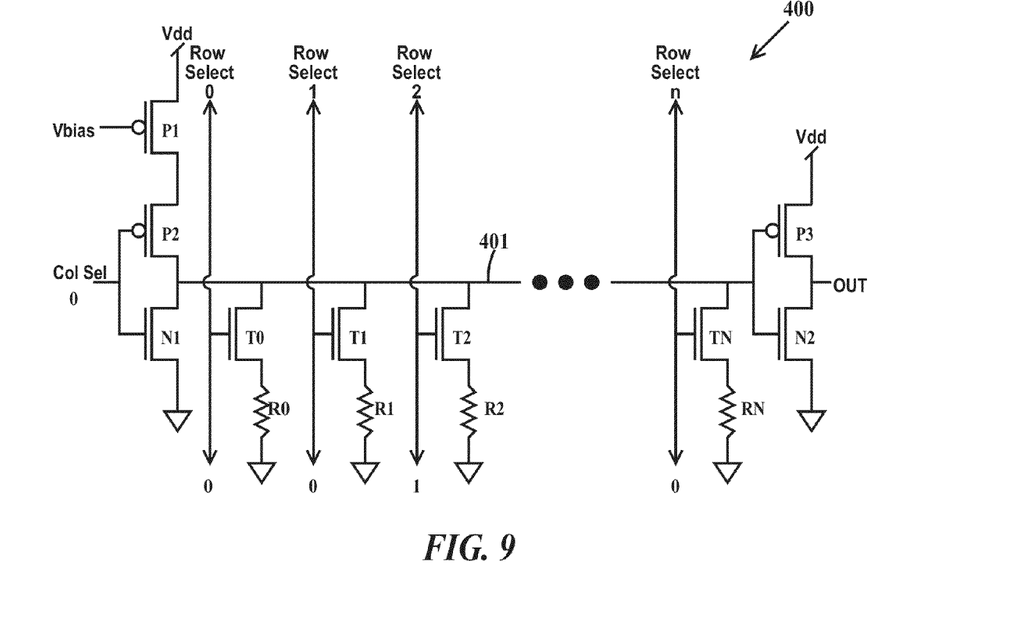
FIG. 9 is an exemplary unclonable coded circuit for generating a security key.

FIG. 9 is an exemplary unclonable coded circuit for generating a security key. In FIG. 9 only one column of row by column array is illustrated. Each column includes PFETs P1, P2, P3 and NFETs N1 and N2 and NFETs T0 through TN and Resistor R0 through RN. Resistors R1 through RN represent contacts to the drains of NFETs T0 through TN that have been "randomized" as to including or not including particles that change the resistance of the contact. The sources of NFETs T0 through TN are connected to a data line 401. The drains of NFETs T0 through TN are connected to ground through respective resistors R0 through RN. The gates of NFETs T0 through TN are connected to respective row select lines 0 through n. In one example, N and n are 19. Col Sel and Vbias allows precharging data line 401 to Vdd. As each row is selected, data line 401 will be pulled to ground if the resistance is low enough compared to the resistance of PFET P1 or not pulled to ground if the resistance is high or if the resistor represents an open (infinite resistance). Thus the output signal OUT will be a key of zeros and ones embodied in an unclonable contact array. By changing the value of Vbias, the resistance of PFET P1 can be changed so the security key is modified but is still unclonable.

Thus the embodiments of the present invention provide randomized coded contact and vias for PUFs in a method for fabricating randomized coded contact and vias that is easily incorporated into conventional integrated circuit fabrication and requires relatively little extra resource.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of forming a randomized coded array, comprising:
    forming a dielectric layer on a semiconductor substrate;
    forming an array of openings extending through said dielectric layer;
    introducing particles into a random set of less than all of said openings; and
    forming a conductive material in each opening of said array of openings, thereby creating said randomized coded array, wherein a first resistance of a pathway through said conductive material in openings containing said particles is different from a second resistance of a path through openings not containing said particles.

2. The method of claim 1, wherein said particles are silica and said first resistance is greater than said second resistance.

3. The method of claim 1, wherein said particles are formed from an electrically conductive material different from said same conductive material and said first resistance is greater than said second resistance.

4. The method of claim 1, wherein said particles are formed from an electrically conductive material different from said same conductive material and said first resistance is less than said second resistance.

5. The method of claim 1, wherein said particles are formed from an electrically conductive material different from said same conductive material and are intermingled with said same conductive material.

6. The method of claim 1, wherein said particles are introduced into said openings, by dipping said substrate into a liquid containing said particles in suspension followed by removing said liquid from said openings.

7. The method of claim 6, wherein the volume density of said particles suspended in said liquid is selected to introduce particles into a preset number of said openings of said array of openings in a preset amount of time.

8. The method of claim 1, wherein said particles are introduced into said openings, by filling remaining openings of said array of openings that are not said openings of said random set of less than all of said openings with a fill material, spin or spray coating said substrate with a slurry of said particles in a liquid and after said removing said liquid, removing said fill material from said remaining openings.

9. The method of claim 1 wherein after forming said same material, said randomized coded array comprises damascene contacts between a source/drain or gate electrode of a field effect transistor and corresponding wires in an additional dielectric layer formed on a top surface of said dielectric layer.

10. The method of claim 1 wherein after forming said same material, said randomized coded array comprises damascene vias, single damascene wires, or dual damascene wires between upper damascene wires in an upper dielectric layer formed on a top surface of said dielectric layer and lower damascene wires or contacts in a lower dielectric layer formed directly under and between said dielectric layer and said semiconductor substrate.

11. The method of claim 1, wherein forming a same conductive material in each opening of said array of opening comprises:
    forming an electrically conductive conformal layer on said dielectric layer and sidewalls and a bottom of said openings;
    forming an electrically conductive core layer on said electrically conductive conformal layer; and
    performing a chemical-mechanical polish, after said chemical-mechanical polish, top surfaces of said dielectric layer and said fill material in said opening are coplanar.

12. A randomized coded array, comprising:
    a dielectric layer on a semiconductor substrate;
    an array of openings extending through said dielectric layer;
    particles in a random set of less than all of said openings; and
    a same conductive material in each opening of said array of openings, wherein a first resistance of a pathway through said conductive material in openings containing said particles is different from a second resistance of a path through openings not containing said particles.

13. The randomized coded array of claim 12, wherein said particles are silica and said first resistance is greater than said second resistance.

14. The randomized coded array of claim 12, wherein said particles are formed from an electrically conductive material different from said same conductive material and said first resistance is greater than said second resistance.

15. The randomized coded array of claim 12, wherein said particles are formed from an electrically conductive material different from said same conductive material and said first resistance is less than said second resistance.

16. The randomized coded array of claim 12 wherein, said randomized coded array comprises damascene contacts between a source/drain or gate electrode of a field effect transistor and corresponding wires in an additional dielectric layer formed on a top surface of said dielectric layer.

17. The randomized coded array of claim 12, wherein said randomized coded array comprises damascene vias, single damascene wires, or dual damascene wires between upper damascene wires in an upper dielectric layer formed on a top surface of said dielectric layer and lower damascene wires or contacts in a lower dielectric layer formed directly under and between said dielectric layer and said semiconductor substrate.

18. A physically unclonable function embodied in a circuit, comprising:
    a set of field effect transistors connected between a data line through respective resistors to ground and connected to respective row select lines; and
    wherein said corresponding resistors are embodied in a randomized coded array of contacts comprising:
    a dielectric layer on a semiconductor substrate;
    an array of openings extending through said dielectric layer;
    particles in a random set of less than all of said openings; and
    a same conductive material in each opening of said array of openings, wherein a first resistance of a pathway through said conductive material in openings containing said particles is different from a second resistance of a path through openings not containing said particles.

19. The circuit of claim 18, wherein a source of each field effect transistor of said set of field effect transistors is connected to said data line, a drain of each field effect transistor of said set of field effect transistors is connected to a respective resistor of said corresponding resistor and a gate of each field effect transistor of said set of transistors is connected to a respective row select line of said corresponding row select lines.

20. The circuit of claim 18, further including:
a bias control circuit coupled between Vdd and said data line through a column select circuit; and
an output circuit coupled to an opposite end of said data line from said column select circuit.

* * * * *